Sept. 1, 1959 KAI-KOBAD S. KUKA 2,902,635
ELECTRIC HOIST CONTROLS
Filed Dec. 19, 1955 4 Sheets-Sheet 1

INVENTOR.
BY Kai-Kobad S. Kuka
Harry P. Canfield
Attorney

INVENTOR.
Kai-Kobad S. Kuka
BY Harry C. Canfield
Attorney

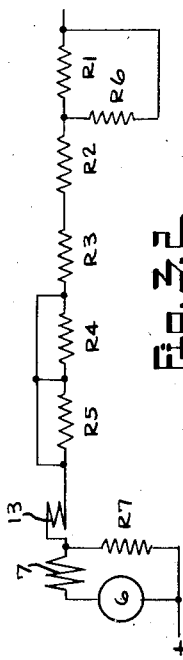
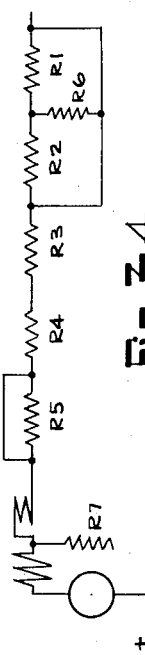
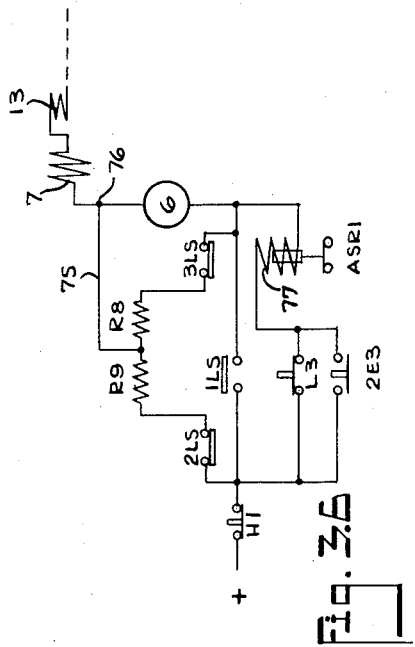
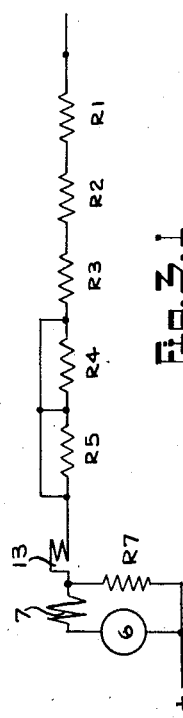
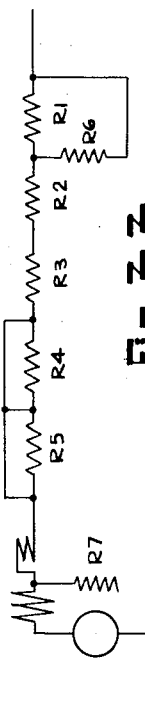
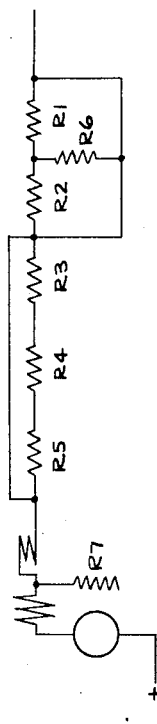
INVENTOR.
BY Kai-Kobad S. Kuka

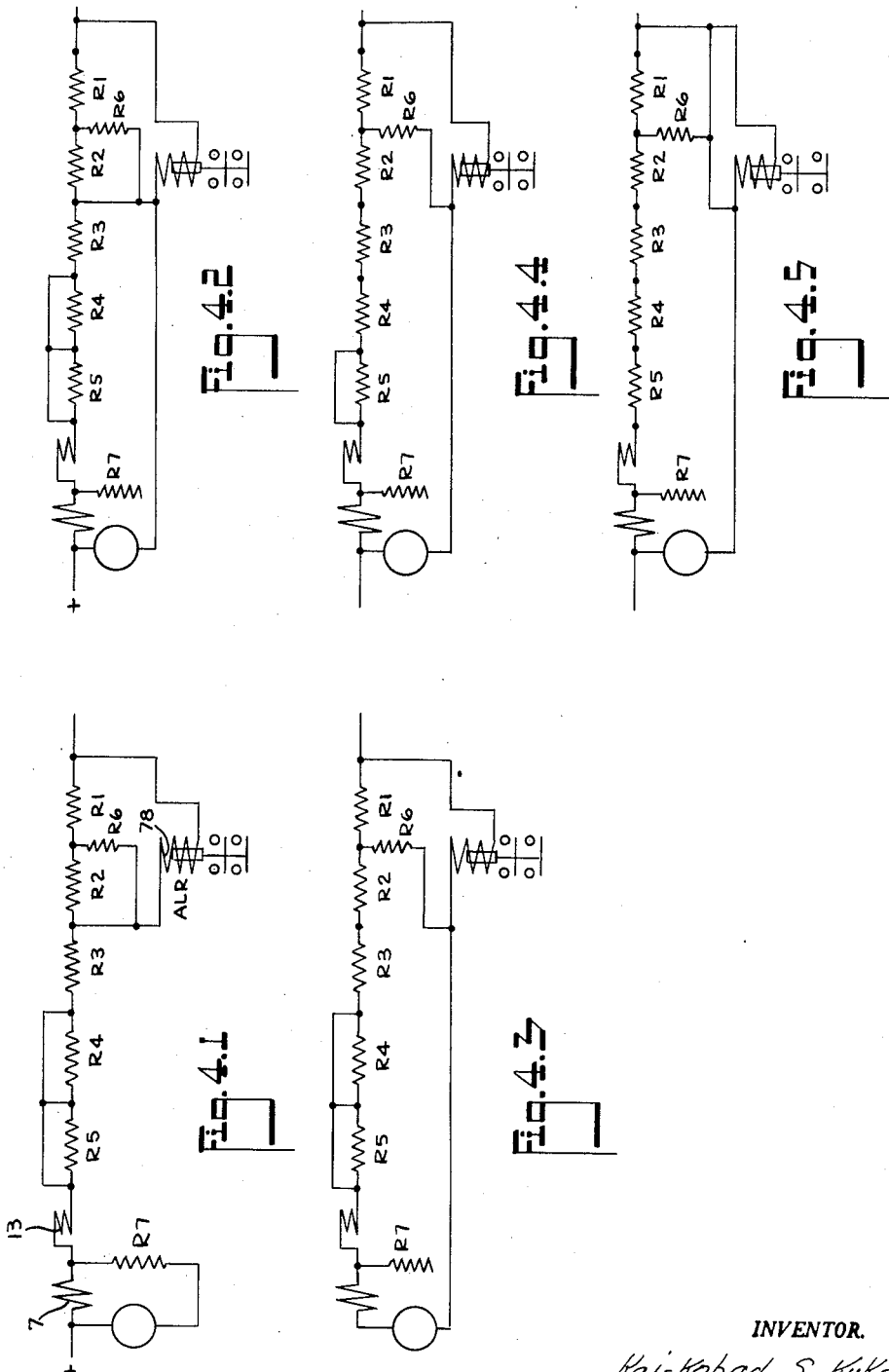

United States Patent Office 2,902,635
Patented Sept. 1, 1959

2,902,635

ELECTRIC HOIST CONTROLS

Kai-Kobad S. Kuka, Jamshedpur, India, assignor to The Clark Controller Company, Cleveland, Ohio, a corporation of Ohio Application December 19, 1955, Serial No. 554,011

4 Claims. (Cl. 318—258)

This invention relates to electric motor operated hoists, and particularly to controls for the motors thereof.

A known class of electric hoists and controls comprises an electric motor drivingly connected to a hoist-cable winding-drum; and a plurality of electromagnetic contactors selectively operable by a manual master controller, controlling circuits for varying the motor speed in the cable winding or load hoisting direction, and in the unwinding or load lowering direction, and for bringing the motor to rest.

In some hoists of this class, limit switches have been provided, mechanically operated by the hoisting movement, which prevent hoisting beyond a preselected maximum height.

The present invention relates generally to electric hoists and controls of this class.

The objects of the invention are to provide improvements in electric hoists and controls which obviate defects and disadvantages present in the art heretofore; among which are the following.

In prior controls of this class when the operator moves the master controller to a so-called "off" point, power is cut off from the motor, and an electrically releasable friction brake sets, stopping the motor. It is possible for the operator to do this abruptly and at a time when the cable supported load is being lowered at high speed.

In such event, particularly when there is a heavy load on the cable, the inertia of the load will impose a sever, and, in some instances, destructive jerk and strain on the hoisting apparatus.

The present invention obviates this by providing automatic means, that brakes the motor by dynamic braking, slowing it down during a timed interval, after the master goes to off position and before the brake sets.

A similar disadvantage is expressed in prior controls when the operator reverses the control from high speed lowering to hoisting. In this case a surge of current is imposed on the motor that may be high enough to be damaging.

This is obviated in the present invention by means automatically limiting the motor current to a safe value for a timed period after the reversal is made.

In some prior hoist controls in which a hoist limit switch is used, the motor will be stopped in the hoist direction by operation of the limit switch. The motor will then be reversed by the limit switch and driven in the lowering direction. The limit switch will then ultimately reset; and if the master controller is still in the hoist position, as is often the case, the motor will be reversed into the hoist direction again and will again operate the limit switch. This will go on repeatedly, with pumping or cycling characteristics, and plugging reversals of the motor, accompanied by surges of reversing current.

This so-called "cycling" and the disadvantages thereof and other defects in the mode of operation of prior hoist limit switches are obviated in the present invention by a limit switch whose contacts establish a dynamic braking circuit for the motor when the hoisting motor operates it.

This rapidly slows down the hoisting motor and as it comes to rest, automatic means cuts off the power supply and the friction brake sets and holds the motor and its load at dead rest, even if the master controller is still in a hoist position.

To restore the limit switch the master controller is moved to one of the lowering positions which operates the motor in the lowering direction and ultimately will reset the limit switch; but, while the contacts of the limit switch are still in operated condition, pending their restoring to normal, they maintain a dynamic braking circuit on the motor which constrains it to low lowering speed and insures reliable operation and resetting of the limit switch, even if the master controller has been moved to one of the higher lowering speeds.

Supplementing the aforesaid automatic dynamic braking of the motor independently of the master controller while the motor is being brought out of the limit switch operating zone by a lowering point of the master controller, the motor is dynamically braked at all lowering points of the master controller whenever the lowering speed, due in some cases to great load, becomes an overhauling speed and would otherwise become an excessive speed.

Other objects will become apparent hereinafter to those skilled in the art to which the invention appertains.

The invention itself is set forth in the appended claims.

One embodiment of the invention is fully disclosed in the following description taken in connection with the accompanying drawing in which.

Figure 1:
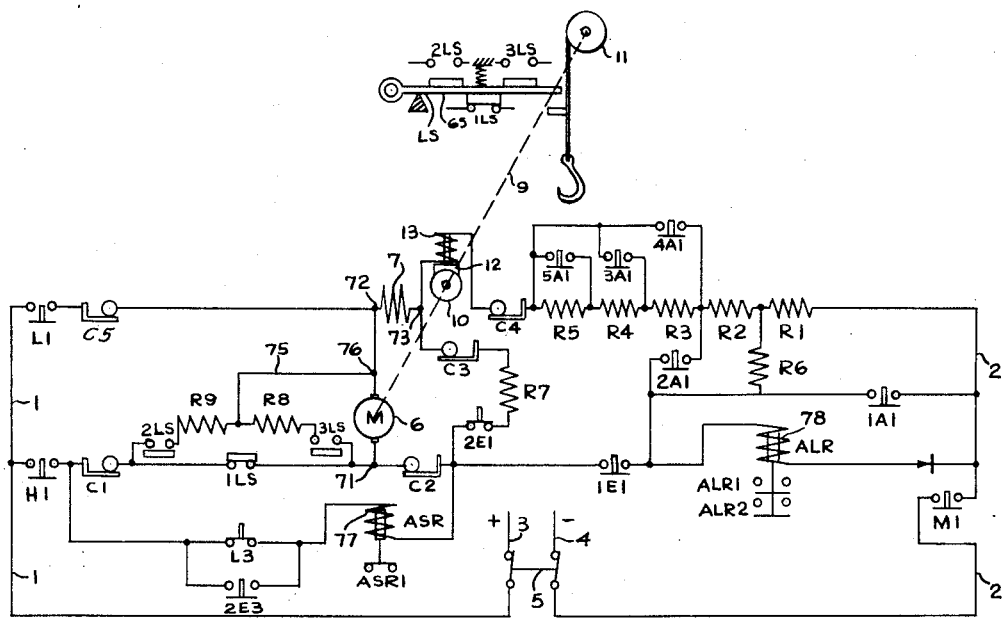
Fig. 1 is a diagrammatic view of a motor operated electric hoist system embodying the invention, comprising contacts, the closing and opening of which control the operation of the system.

Figs. 3.1 to 3.5 are diagrammatic views illustrating hoisting circuits made in the system of Fig. 1 by operation of its contacts;

Fig. 3.6 is a diagrammatic view showing contacts and circuits of a hoist limit switch, in operated condition, which are shown in normal condition in Fig. 1;

Figs. 4.1 to 4.5 are diagrammatic views illustrating lowering circuits made in the system of Fig. 1 by operation of its contacts.

Referring to the drawing, Fig. 1, which is an across-the-line type of diagram, there are shown side lines at 1 and 2, connected to positive and negative supply mains 3—4 by a switch 5; and between the side lines is an electric system including a D.C. hoist motor referred to generally as M, and shown as comprising an armature 6, and a series field 7.

As indicated by the dotted line 9 the armature 6 is connected to a friction brake drum 10 and to a hoist cable drum 11. The brake drum is provided with a brake shoe 12, retractable by a winding 13 to release it and mechanically setting when the winding 13 is de-energized.

The motor system provides for operating the motor M to drive the drum 11 in the hoisting direction; or in the lowering direction; or for braking it by dynamic braking, etc.; and to these ends different circuits are made by the closing or opening of certain contacts, shown in Fig. 1 at H1, L3, 2E3, 1E1, M1, 1A1, 2A1, 3A1, 4A1, 5A1, 2E1, and L1.

These contacts are reproduced in Fig. 1 from Fig. 2, where, as will be described, they appear as the contacts of electromagnetic contactors.

In Fig. 1, also are shown resistors at R1 through R7 variably connected in the system by operation of some of said contacts.

At the top of Fig. 1, generally at LS is a hoist limit switch which during normal hoisting and lowering operations of the motor remains unoperated with contacts 1LS thereof closed and contacts 2LS and 3LS open, as shown.

In the event that during hoisting movement the crane hook or the load thereon goes beyond a preselected upper limit, an arm 65 of the switch is raised thereby and opens contacts 1LS and closes contacts 2LS and 3LS. These contacts are reproduced elsewhere in Fig. 1 in association with a pair of resistors R8 and R9.

Figure 2:
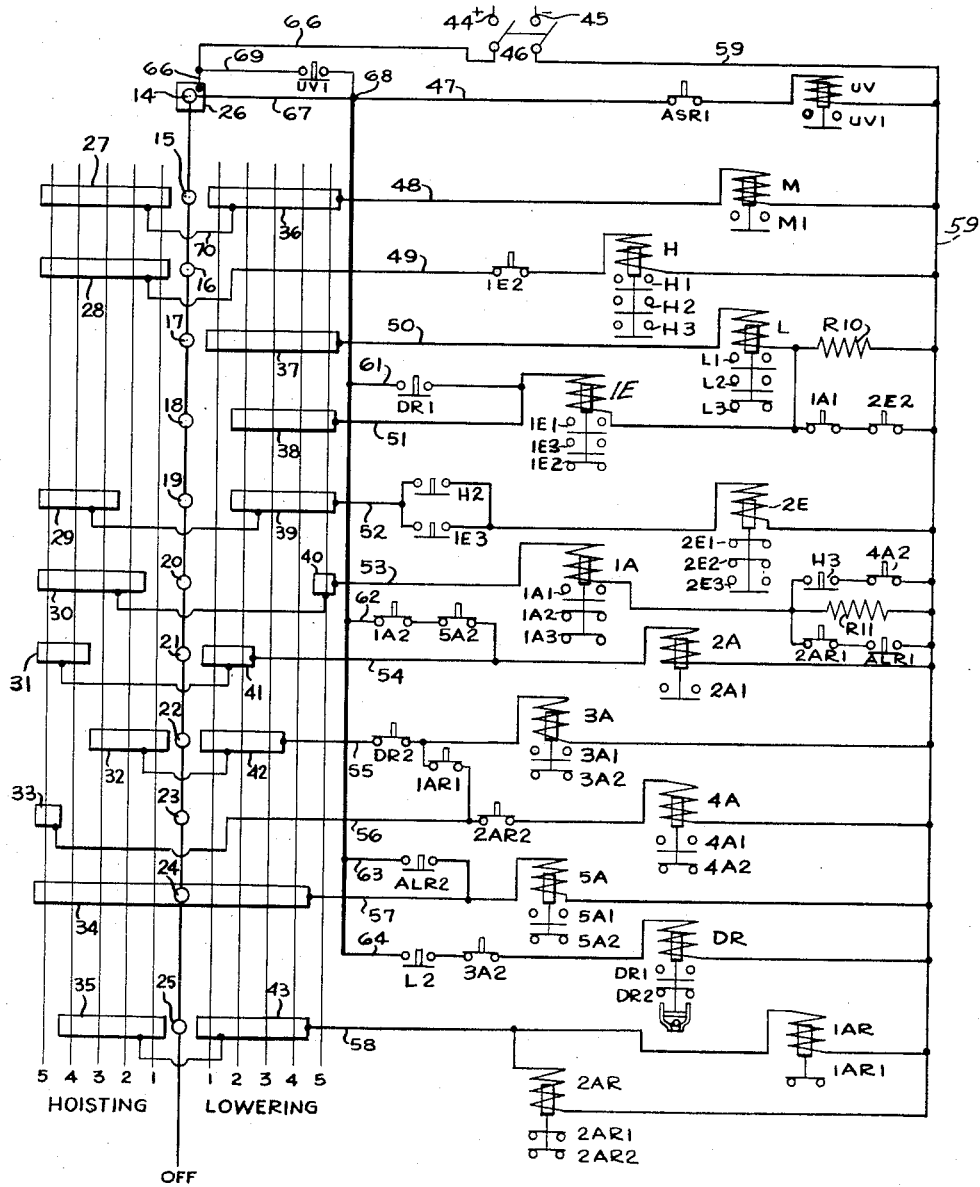
Fig. 2 is a diagrammatic view of a master controller and magnetic contactors, for operating the contacts of Fig. 1.

In Fig. 1 at ALR is a magnetic contactor having normally open contacts ALR1 and ALR2; and at ASR is a contactor having normally closed contacts ASR1, these contacts being reproduced in Fig. 1 from Fig. 2.

The invention is applicable to hoists of the travelling crane or bridge type wherein the motor and hoist drum are propelled over a ground or floor area to be served by the hoist and the current supply mains are connected to stationary trolley cables, and electric connection between the trolley cables and the motor and parts travelling with it, is maintained by collectors sliding or rolling on the trolleys.

In Fig. 1, collectors for this purpose have been shown at C1 through C5.

As indicated in the foregoing the motor system of Fig. 1 is controlled to perform its functions by selective operation of certain contacts; and such selection is made by means of a controller operable manually, and shown diagrammatically in Fig. 2.

The controller is of the drum type and actuates a plurality of electromagnetic contactors controlling the said contacts. Drum controllers are well known and have been variously constructed.

The drum controller hereof, in the diagrammatic showing of Fig. 2, comprises a series of twelve contacts 14 to 25 all connected together and in vertical alignment in a position designated "off," from which position the contacts may all be moved bodily by an operator toward the left into successive "hoisting" positions designated by vertical lines numbered 1 to 5; or moved toward the right into successive "lowering" positions designated by vertical lines numbered 1 to 5.

In the "off" position, the contact 14 makes contact with a bar contact 26.

In the "hoisting" position, some of the contacts 15 to 25 make contact with bar contacts 27 to 35; and, in the "lowering" positions, make contact with bar contacts 36 to 43 and bar contact 34.

As will be described, positive potential from line 44 is communicated to the drum contacts and thence through cross lines 47 to 58 to a bus line 59 connected to negative line 45. The cross lines 47 to 58 each contain a winding of an electromagnetic contactor.

Another bus line 60 is subjected to positive potential, and connections to it at 61 to 64 supplement the cross lines.

The magnetic contactors are as follows.

A contactor UV having normally open contacts UV1;
A contactor M having normally open contacts M1;
A contactor H having normally open contacts H1, H2, H3;
A contactor L having normally open contacts L1, L2 and normally closed contacts L3;
A contactor 1E having normally open contacts 1E1 and 1E3, and normally closed contacts 2E1 and 2E2;
A contactor 1A having normally open contacts 1A1, and normally closed contacts 1A2 and 1A3;
A contactor 2A having normally open contacts 2A1;
A contactor 3A having normally open contacts 3A1 and normally closed contacts 3A2;
A contactor 4A having normally open contacts 4A1, and normally closed contacts 4A2;
A contactor 5A having normally open contacts 5A1 and normally closed contacts 5A2;
A contactor DR having normally open contacts DR1 and normally closed contacts DR2; this contactor being timed to operate the contacts instantly from the normal position; but to delay restoring of the contacts;
Contactor 1AR having normally closed contacts 1AR1;
Contactor 2AR having normally closed contacts 2AR1 and 2AR2.

The contactors above described are shown with their contacts but without connections to the contacts; and the contacts are reproduced elsewhere in Figs. 1 and 2 by themselves with connections thereto; to simplify the drawing.

Off conditions

In Fig. 2 upon closing line switch 46, negative potential of line 45 is communicated to bus line 59.

With the drum controller of Fig. 2 in "off" position as shown, positive potential is communicated from line 44 by wire 66 to bar contact 26 and thence to contact 14. Contact 14 is connected by wire 67 to bus line 60 at point 68 and gives positive potential to bus line 60.

Current flows in cross line 47 between positive and negative bus lines 60 and 59, through closed contacts ASR1 and winding of contactor UV, operating the contactor and closing its contacts UV1.

Positive potential is then communicated to bus line 60 from wire 66 through wire 69 and closed contacts UV1, independently of bar contact 26.

Contact 14 and all of the other contacts, 15 through 25, connected to it, may now be moved to "hoisting" positions or "lowering" positions. Contact 14 will leave bar contact 26; but bus line 60 and all of the contacts 15 to 25 connected to it through wire 67 will be maintained positive and contactor UV will be maintained operated, all through the agency of closed contacts UV1.

Thus while the drum controller is in any hoisting or lowering position, if due to any cause contactor UV should become de-energized and open its contacts UV1 (for example by opening of contacts ASR1), positive potential would be removed from bus line 60 and from all of the contacts 14 to 25, and all contactors of Fig. 2, that were operated would restore.

In the off position, as shown, positive contact 24 is always engaged with contact bar 34 except in the 5th lowering position; and current flows from bar 34 through cross line 57, winding of contactor 5A, operating contactor 5A and closing contacts 5A1 and opening contacts 5A2.

In Fig. 1, contacts 5A1 keep resistor R5 cut out at all times except in the 5th lowering position.

Hoisting

When the drum controller of Fig. 2 is moved to the first hoisting position, contact 15 goes onto bar 27, thereby energizing cross line 48 and operating contactor M, closing its contacts M1.

At the same time, contact 16 goes onto bar 28 and energizes cross line 49, through closed contacts 1E2, operating contactor H, and closing its contacts H1, H2, H3.

At the same time contact 22 goes onto bar 32 and energizes cross line 55 through closed contacts DR2 of de-energized contactor DR, operating contactor 3A closing contacts 3A1 and opening contacts 3A2.

In Fig. 1, contacts H1 and M1 thus being closed, and contacts 5A1 already closed as described, main motor current flows, from line 1 over the path H1, C1, 1LS, to a point 71, and there divides part going through motor armature 6, series field 7, brake winding 13, C4, closed contacts 5A1 (bridging resistor R5), closed contacts 3A1 (bridging resistor R4); and through resistors R3, R2, R1 in series and M1 to line 2.

At point 71, the other part of the current goes through a circuit, in parallel with the armature 6 and series field 7, by way of C2, contacts 2E1, a resistor R7, and C3.

These circuit conditions are shown in Fig. 3.1 wherein the motor armature 6 and series field 7 are connected in series; with a shunt around them through the resistor R7.

The total current goes through the brake winding 13 and releases the brake; and is limited by the resistors R3, R2, R1.

On going to the second hoisting point, Fig. 2, contact 20 goes to bar 30, and thereby energizes cross line 53 and operates contactor 1A, closing contacts 1A1 and opening contacts 1A2, 1A3. In this instance cross line 53 is energized through contacts H3 closed as described and closed contacts 4A2.

In Fig. 1, closing of contacts 1A1 introduces resistor R6 in parallel with resistor R1.

These conditions are in Fig. 3.2, the total motor resistance being less than in Fig. 3.1 giving the motor more current and higher speed.

On going to the third hoisting point Fig. 2, contact 19 goes to bar 29 and thereby cross line 52 is energized through contacts H2 closed as described, and operates contactor 2E opening its contacts 2E1 and 2E2 and closing 2E3.

In Fig. 1, opening of contacts 2E1 opens the shunt circuit around the motor 6—7, and gives the motor more current and higher speed.

These conditions are shown in Fig. 3.3.

On going to the fourth point of hoisting Fig. 2, contact 22 comes off of bar contact 32, and this de-energizes cross line 55 and restores contactor 3A and it opens contacts 3A1 and closes contacts 3A2. At the same time contact 21 goes on bar 31 and this energizes cross line 54 and operates contactor 2A closing contacts 2A1.

In Fig. 1, contacts 3A1 upon opening introduces resistor R4, and contacts 2A1 upon closing cuts out resistor R1, R2 and R6, reducing the total motor resistance to R3 and R4.

These conditions are shown in Fig. 3.4.

On going to fifth point hoisting, Fig. 2, it may first be interjected that contact 25 went on bar 35 on the first point hoisting and remained thereon through hoisting points 2 to 4, above described thereby energizing cross line 58 and operating contactor 2AR, opening contacts 2AR1 and 2AR2, and keeping them open throughout hoisting points one to four.

On going to fifth hoisting point, however, contact 25 comes off of bar 35 and restores contactor 2AR, closing contacts 2AR1 and 2AR2.

On going to the fifth point of hoisting, contact 23 goes on bar 33 and thereby energizes cross line 56 through contacts 2AR2 closed as described, and operates contactor 4A, closing its contacts 4A1 and opening 4A2.

In Fig. 1, contacts 4A1 upon closing cut out the remaining resistors R3 and R4 so that all of the resistors R1 to R6 are then out of the motor circuit and the motor runs at top speed.

These conditions are shown in Fig. 3.5.

In general as will be seen Figs. 3.1 to 3.5, the motor on hoisting operates as a series motor.

It will be noted however that on hoisting points 1 and 2, there is a shunt circuit around the motor field and armature containing resistor R7, which diverts current from the motor, providing for low speed on these points. At the same time, all of the current through both the motor and the shunt goes through the brake winding 13 to give it strong releasing current.

This shunt also performs functions in connection with lowering to be referred to.

Opening of the shunt circuit on hoisting point 3, is provided for, as a simple means of causing all of the current to go though the motor to give a higher hoist speed on that point.

It will thus be seen (Figs. 3.1 to 3.5) that by utilizing the shunt resistor R7 to perform particular functions, at low speeds of hoisting (and also lowering as will be described), five hoisting speeds are obtained with only three changes of the main series resistance; resulting in simplification of the controller of Fig. 2 and the system of Fig. 1.

On operating the controller of Fig. 2 backward over hoist positions toward position 1, the same circuit for each position are made as described, to reduce hoisting speed.

Lowering

When the controller of Fig. 2 is moved to the first lowering position contact 15 goes on bar 36 thereby energizing cross line 48 and operating contactor M and closing its contacts M1.

At the same time contact 17 goes on bar 37 energizing cross line 50 and operating contactor L, closing its contacts L1, L2, and opening L3.

At the same time contact 21 goes on bar 41 energizing cross line 54, operating contactors 2A and closing its contacts 2A1.

At the same time contact 22 goes on bar 42 energizing cross line 55 through closed contacts DR2, operating contactor 3A, and closing contacts 3A1 and opening contacts 3A2.

In Fig. 1 upon closing of contacts M1, L1, 2A1 and 3A1, current flows to the motor from line 1 through contacts L1 to a point 72 and there divides, part flowing through the armature 6 to said point 71 and thence through closed contacts 2E1 and resistor R7 to a point 73 between the series field 7 and the brake winding 13; and part flowing from point 72 through the series field 7 to point 73; all of the current flowing from the point 73 through the brake winding 13, and releasing the brake. The armature is thus in parallel with the series field.

Closing of contacts 3A1 cuts out resistor R4, resistor R5 being already cut out as decribed.

Closing of contacts 2A1 makes a low resistance path from a point 74 between resistors R3 and R2 through contacts 2A1 and winding 78 of contactor ALR to line 2, in effect bridging resistors R1, R2, R6, so that of the resistors R1 to R6, R3 alone is in the circuit.

These conditions are shown in Fig. 4.1.

On going to the second lowering point, in Fig. 2 contact 18 goes on bar 38 energizing cross line 51, operating contactor 1E, and closing contacts 1E1, 1E3, and opening contacts 1E2.

At the same time contact 19 goes on bar 39 energizing cross line 52, through contacts 1E3 now closed, operating contactor 2E, opening contacts 2E1 and 2E2 and closing contacts 2E3.

In Fig. 1 opening of contacts 2E1 opens the said parallel connection of the armature through resistor R7, and closing of contacts 1E1 makes another parallel connection for the motor armature, from the point 72, through the armature 6 to point 71, through closed contacts 1E1 through the winding of contactor ALR to line 2. In effect, the armature 6 is across the lines 1 and 2; and the series field 7 is across the lines 1 and 2 but in series with resistor R3.

The conditions are as in Fig. 4.2.

On going to the third lowering point contact 21 leaves the bar 41, de-energizing cross line 54, and contactor 2A restores opening contacts 2A1.

In Fig. 1, opening of contacts 2A1, introduces resistor R2 in series with resistor R3; and introduces resistor R1 in parallel with resistor R6, these resistors being now in the path of the series field current.

These conditions are shown in Fig. 4.3.

On going to the fourth lowering point, Fig. 2, contact 22 leaves bar 42 de-energizing cross line 55, and contactor 3A restores, opening contacts 3A1 and closing 3A2.

In Fig. 1 opening contacts 3A1 introduces resistor R4 into the field circuit.

These conditions are shown in Fig. 4.4.

On going to the fifth point of lowering, contact 24 comes off of bar 34 de-energizing cross line 57 and contactor 5A restores opening contacts 5A1 and closing 5A2.

At the same time contact 20 goes on bar 40 energizing cross line 53, operating contactor 1A and closing contacts 1A1 and opening 1A2 and 1A3.

In Fig. 1, closing of contacts 1A1 short circuits the winding 78 of contactor ALR and it restores opening contacts ALR1 and ALR2; and opening of contacts 5A1, introduces resistor R5 into the series field circuit.

These conditions are shown in Fig. 4.5.

It will be noted, that in lowering, Figs. 4.1 to 4.5, the motor operates in general as a shunt motor, the field 7 being always across the line in series with resistance variable in steps for speed variation.

Lowering may be effected by power driving the motor in lowering direction; successive steps on the controller Fig. 2 increasing the field circuit resistance, as shown in going from Fig. 4.1 to 4.5, thereby weakening the field, and increasing the speed.

Lowering may also occur upon overhauling of the motor armature, by the load alone, or concurrently with power lowering.

On the second to fifth lowering points Figs. 4.2 to 4.5, the armature 6 is connected across the line (through the negligibly low resistance of the winding 78 of relay or contactor ALR) and therefore, in effect, is connected around the field 7 including its speed resistors; and on the first point lowering, Fig. 4.1, is connected directly across the field through the resistor R7.

These connections provide a dynamic braking loop on all lowering points, containing the armature and field.

On any lowering point of the controller of Fig. 2, if the speed of descent of the hoist tends to become excessive dynamic braking of the armature will occur, and prevent excessive speed.

In general, by moving the controller back over the lowering points toward point 1, the lowering speed may be reduced since this will strengthen the field as in from Fig. 4.5 to Fig. 4.1.

Particularly, the said dynamic braking effect, when being developed as described, may be increased by going back over the lowering points since this will decrease the resistance in the said dynamic braking loop as will be seen in going from Fig. 4.5 to Fig. 4.1.

In hoist controls of the instant class, in which speeds of the motor are under manual control, the operator may be lowering a load and then suddenly go to the off position of the controller, which will set the brake and stop lowering.

In prior hoist controls this has had the fault that the lowering of heavy loads may attain such high speed and inertia that sudden stopping by application of the brake produces damaging shock and strain on the apparatus.

This fault has been largely overcome in the present control by automatically limiting the maximum speed of lowering on the higher speed points, by a dynamic braking circuit established upon closing a dynamic braking loop at the contacts 1E1, as already described; and is further obviated by the following means which operates to maintain contacts 1E1 closed and the dynamic braking current flowing and the brake released for a period of time after the controller has been moved to the off position.

Reference is first made to a contactor DR energized in cross line 64 through contacts L2 and 3A2.

When the controller of Fig. 2 was moved from off position to the first lowering position, contactor L operated as described, and closed contacts L2. At the same time, contactor 3A in cross line 55 is energized through the contacts DR2, and opens contacts 3A2 in line 64. Thus contactor DR remains unenergized and restored, with contacts DR2 closed and DR1 open.

When the controller is moved to the fourth or fifth lowering point as here considered, contactor 3A becomes deenergized at the bar contact 42 and closes contacts 3A2 in cross line 64 energizing contactor DR, closing DR1 and opening DR2.

If the controller now be suddenly returned to off position, L2 will open and deenergize contactor DR and it will start to run its time interval at the end of which it will be restored and open contacts DR1. Meanwhile contactor 1E has been held operated for this time period by closed contacts DR1 in cross line 61. Thus contacts 1E1 will be held closed during this time period for the purposes described.

In this connection it will be seen that with contacts 1E1 closed, if dynamic braking develops as described, the dynamic braking current will flow clockwise around the braking loop and keep the brake winding 13 energized and the brake released. Thus during the restoring interval of contactor DR, the brake is held off and the motor is slowed down, so that at the end of the interval, the brake will set and stop lowering without shock.

Again, the operator may move the manual controller from a lowering point abruptly to a hoisting point, thus abruptly reversing the motor. In prior controls of this class, this produces damaging strain and shock as referred to particularly when such reversal is done at high lowering speeds and heavy loads; and develops a high amperage destructive surge in the motor while it is stopping and reversing. This disadvantage is obviated in the present invention by the following means which for a limited time, keeps resistance in the armature circuit which would ordinarily be cut out on the hoisting point, if the motor were starting from rest instead of being reversed from high lowering speed.

Assuming that the controller is on the fifth lowering point; contactor 3A is deenergized at the bar contact 42, cross line 55, and contacts 3A2 in cross line 64 are closed, which, together with closed contacts L2 keep contactor DR operated with contacts DR2 open.

Contacts 3A1 being also open, resistor R4 is not cut out.

If the controller be now abruptly moved to first, second or third hoisting position, contacts L2 in cross line 64 will open, deenergizing contactor DR and it will start its restoring time interval. At the end of the interval its contacts DR2 will close and then contactor 3A will be energized through contacts DR2 in cross line 55, and it will operate to cut out the resistor R4.

In a similar manner, resistor R4 will be retained in the hoisting circuit for said time interval if the reversal is made from the fourth point lowering.

On the fifth point of lowering, Fig. 2, cross line 64 becomes deenergized and contactor 2AR restored, closing contacts 2AR1.

Also, cross line 53 is then energized through contacts 2AR1 and ALR1 and contactor 1A operates as described. Contacts 1A1 in Fig. 1 short circuits the winding of contactor ALR and it restores opening contacts ALR1 in cross line 53; but the energizing current in cross line 53 then goes through resistor R11 and maintains contactor 1A operated.

Also on the fifth lowering point, in cross line 51, closed contacts 1A3 keep contactor 1E operated and maintain the said armature loop through contacts 1E1. When contactor 1A operates as just described it opens contacts 1A3 in cross line 51 and then the line 51 is energized through resistor R10, keeping contactor 1E operated and loop contacts 1E1 closed.

Upon going to the fifth lowering position, cross line 57 will be deenergized at bar 34 and restore contactor 5A and open contacts 5A1 to insert resistor R5 as described. However this is prevented from occurring until after all of the other loop resistance has been cut out by closing of contacts 1A1 upon operation of contactor 1A, as follows.

Contactor ALR in Fig. 1 keeps contacts ALR2 closed, until contacts 1A1 close and short circuit the winding of ALR. These contacts ALR2 are in cross line 63 Fig. 2 and keep contactor 5A energized and contacts 5A1 closed until the short circuit by contacts 1A1 causes contacts ALR2 to open.

*Limit switch operation*

During hoisting, on any hoisting point, if overtravel should occur and should operate the limit switch LS as referred to, then in Fig. 1 contacts 2LS and 3LS will close and contacts 1LS will open as described.

Contacts L3 will be closed since contactor L of Fig. 2 is always in restored condition on the hoisting points. These conditions will be as in Fig. 3.6.

As shown in Fig. 1 during hoisting on any point, the motor armature 6 and field 7 are connected, in series, and supplied with current from the line 1, through contacts 1LS.

When the limit switch has operated, Fig. 3.6, the field 7 is energized alone from the line through closed contacts H1, 2LS, a resistor R9, a wire 75 to point 76, thence to field 7 and brake winding 13; and therebeyond as in Figs. 3.1 to 3.5 according to the hoisting point at the time.

At the same time the armature 6 is cut off from the line 1 at open contacts 1LS and is put in a dynamic braking circuit, traced from the armature 6, through closed contacts 3LS, a resistor R8, wire 75, point 76 back to the armature.

Thus dynamic braking of the motor begins at once when the limit switch operates.

The values of the resistors R8 and R9 are chosen such that the braking effect will quickly slow down the motor armature, even if hoisting was occurring with light load and at the high speed conditions of hoisting point five, Fig. 3.5.

In Fig. 1 and Fig. 3.6, the winding 77 of contactor ASR is connected across the limit switch contacts 1LS. During normal operating conditions, this winding 77 is unenergized, being short-circuited by closed contacts 1LS on hoisting or open-circuited at open contacts L3 on lowering; and contacts ASR1 remain closed.

When the limit switch has operated, Fig. 3.6, the winding 77 of contactor ASR will be subjected to whatever drop of potential occurs in the resistors R9 and R8, Fig. 3.6, during dynamic braking of the motor in the hoisting direction.

The dynamic braking current in resistor R8, flowing to the wire 75, produces a drop of potential therein in opposition to the drop of potential produced by the field current flowing in the resistor R9 to the wire 75; and these potentials tend to neutralize each other, so that the winding 77 is subjected to little or no potential thereby.

Operation of the limit switch in any case will be due to lack of skill or inadvertence of the operator in leaving the controller of Fig. 2 on some hoisting point too long, and the conditions will be that of one of the Figs. 3.1 to 3.5 according to which the resistance in series with the field 7 represented by the dotted line in Fig. 3.6 will have some definite value.

In Fig. 3.6 therefore the field current in the resistor R9 and the potential drop therein, will remain constant; but the armature current in R8 and the potential drop therein begins large and dies out to a small value as braking and slowing down of the motor goes on.

The potential drop in resistor R8 is thus predominated over, more and more by the potential drop in resistor R9 as the motor slows down and the winding 77 is therefore subjected to an increasing differential potential.

When this rising differential potential reaches a predetermined value, preferably at which the motor has come substantially to rest, the contactor ASR is operated thereby, and opens its contacts ASR1.

In Fig. 2, these contacts ASR1, appear in cross line 47, and opening thereof de-energizes cross line 47, and contactor UV restores opening contacts UV1, which as described will cause all contactors, that are operated at the time, to restore.

The controller of Fig. 2 being on some hoist position, this restoring of contactors will include contactors H and M and their contacts H1 and M1 of Fig. 1, will open and completely cut off the motor and the limit switch contacts from the line.

This de-energizes the brake winding 13 and sets the brake 10—12 which will completely stop the motor and hold it and the load thereon at rest.

Current in both resistors R9 and R8 now stops flowing and contactor ASR therefore restores, closing ASR1.

Thus the overall result of operation of the limit switch is to dynamically brake the motor with a strong field; and then at a predetermined low motor speed, to cut it off from the line and set the friction brake to hold the motor and the load at rest.

As will be apparent, when the motor comes to rest the limit switch is still in operated condition.

To restore the limit switch the hoist must be operated in the lowering direction. To do this the controller Fig. 2 is first moved to "off" position, which, as will now be understood, contacts ASR1 in cross line 47 being closed, operates contactor UV and puts the system in condition for lowering operation.

It is a desirable advantage of the present invention that low speed of the motor is maintained during restoring of the limit switch. This can be done by going to low speed lowering point 1 on the controller Fig. 2. But if by inadvertence the controller is moved to a higher lowering speed point, then the motor will nevertheless be restrained to low speed because until the limit switch is restored, its contacts 3LS remain closed, providing a closed loop around the armature through the contacts 3LS and resistor R8. If lowering is on point 1, Fig. 4.1, the motor speed will be low, in any event, due to the resistor R7, and is made still lower by the diverting of armature current through the resistor R8.

If lowering is done on a higher speed point, and the motor tends to speed up, its speed will be curtailed by the said loop acting as a dynamic braking loop.

The limit switch is thus restored by lowering, without shock or sudden change of motor torque; and there is no possibility that the limit switch upon restoring can start the motor in the hoisting direction again, resulting in a repeating cycle of hoisting and lowering in the area of the limit switch, such as occurs with some prior art hoist limit switches.

In normal operation, the limit switch operates upon hoisting beyond limits, to cut off power and brake the motor to rest.

Provision is also made to cut off power and brake the motor to rest if due to any unintended cause the limit switch should operate during lowering, as follows.

On lowering points two to five, contactor 2E is operated by cross line 52 through contacts 1E3, the latter kept closed by contactor 1E always held operated by cross line 51.

In Fig. 1 and Fig. 4.6, contacts L3 will always be open and contacts 2E3 will always be closed during lowering.

If the limit switch should by accident go to operated condition, Fig. 3.6 during lowering, a dynamic braking loop would be made across the armature through wire 75, resistor R8 and contacts 3LS. Also there would be a loop across the armature by way of wire 75, resistor R9, contacts 2LS, contacts 2E3 (closed on lowering as described) and winding 77 of contactor ASR. This would operate ASR and open its contacts ASR1, which as described hereinbefore for Fig. 2, causes the line to be cut off from the system and the brake to set.

I claim:

1. In an electric hoisting system, source current mains; a motor having an armature, and a series field winding; a friction brake for the motor having a brake winding energizable to release the brake and mechanical means to set the brake when the winding is deenergized; a hoist mechanism operable by the motor to hoist a load; a limit switch operable by the hoist mechanism at a predetermined elevation of the load, and restoring to normal condition at lower elevations of the load, and having normally closed and open contacts which are opened and closed respectively by the limit switch when operated; a controller having hoist points and hoist magnetic contactors operable at said points which establish a main circuit from the source mains through normally closed contacts of the limit switch, through the motor armature and series field winding and brake winding all in series to release the brake and drive the motor in hoisting direction; the limit switch when operated, opening its normally closed contacts which cut off source current to the armature and open the said main circuit; and closing its normally open contacts, which establish a closed dynamic braking circuit around the armature through a braking resistor; and which estabilsh a field energizing circuit from the source through a field resistor and through the field winding and brake winding; the brake resistor and field resistor being connected so that the drops of potential therein are in opposition, and being chosen so that their differential of potential is small when the limit switch operates and the motor is still running at hoisting speed; a magnetic normally restored relay having a winding connected to be energized by the said differential potential and remaining restored when the differential is small; the motor upon slowing down by dynamic braking, reducing the drop of potential in the braking resistor and causing the drop of potential in the field resistor to have more and more predominance thereover whereby the said differential potential rises, and, at a low speed of the motor, operates the relay energized thereby; the relay having contacts and a circuit connected thereto controlling the main contactors and causing them to restore and cut off the source current mains from the system, and thereby deenergize the brake winding, and cause the brake to set and bring the motor to dead rest, and hold it at rest.

2. A system as described in claim 1 and in which the controller has lowering points and lowering magnetic contactors operable at said lowering points, which establish a circuit from the mains through the field and brake winding in series and a circuit through the armature, in parallel with the field to effect power lowering of the load, independently of the operated limit switch, to restore the limit switch, and the limit switch contacts that established a dynamic braking circuit upon operation thereof maintain the dynamic braking circuit closed, to insure low lowering speed while the limit switch is being restored.

3. In a control system for controlling the lowering operations of an electric hoist, a hoist driving motor comprising an armature and a field winding; a mechanically setting motor brake releasable by an electromagnetic winding when energized; a plurality of serially connected speed resistors; an electric power source; a manually operable controller having a succession of points corresponding to successively higher motor lowering speeds, and actuating magnetic contactors on said points; and on the first point actuating contactors that establish a first closed loop containing a loop resistor, the armature and the field winding; and that connect the field winding and brake winding in series with the speed resistors and across the power source; the controller on successive points actuating contactors that establish a second closed loop containing the armature, the field winding and brake winding and speed resistors, and maintain it closed on all said successive lowering points and that make various connections at the speed resistors that successively increase their total resistance; and the controller on one of said successive points actuating contactors that open the said first loop and maintain it open on all subsequent successive points; and the controller having an off point at which said contactors are actuated to cut off said connection with the source and accordingly deenergize the brake and cause it to set, and to open the second loop; means to prevent immediate setting of the brake and opening of the second loop at said off point, comprising electromagnetic timing means actuated by the controller at the off point to start a time interval, and said timing means controlling the contactors that established the second loop to maintain the second loop closed, independently of the off position of the controller, for the timed interval; whereby the second loop dynamically brakes the motor and slows it down with the aforesaid brake released during said interval.

4. In an electric hoist system, a source of current, a hoisting mechanism, and an electric motor for driving it, and a plurality of serially connected speed resistors; a manual controller having a plurality of hoisting points and a plurality of lowering points, and at said points energizing contactors to operate and establish circuits from the source through the motor and through the speed resistors, and on successive points to vary the total resistance of the resistors to vary the motor speed in the hoisting or lowering direction; the controller being operable abruptly from a lowering point to a hoisting point at which the controller contactors effect a reversal of the motor and a change of the total resistance from a lowering value to a value corresponding to the hoisting point; and means delaying operation of the contactors that change the total resistance comprising electromagnetic timing means controlling the last named contactors independently of the controller when at the last named hoisting point.

References Cited in the file of this patent

UNITED STATES PATENTS

| | | |
|---|---|---|
| 1,750,892 | Kennedy | Mar. 18, 1930 |
| 1,817,797 | Baker | Aug. 4, 1931 |
| 2,350,150 | Cooke | May 30, 1944 |
| 2,351,796 | Wright | June 20, 1944 |
| 2,421,080 | Newman | May 27, 1947 |
| 2,579,317 | Hepperlen et al. | Dec. 18, 1951 |